United States Patent [19]
Bergmans

[11] Patent Number: 5,463,654
[45] Date of Patent: Oct. 31, 1995

[54] TRANSMISSION SYSTEM WITH INCREASED SAMPLING RATE DETECTION

[75] Inventor: Johannes W. M. Bergmans, Eindhoven, Netherlands

[73] Assignee: U.S. Philips Corporation, New York, N.Y.

[21] Appl. No.: 98,673

[22] Filed: Jul. 28, 1993

[30] Foreign Application Priority Data

Aug. 3, 1992 [EP] European Pat. Off. ............. 92202394

[51] Int. Cl.$^6$ ................................................ G01H 1/00
[52] U.S. Cl. ......................... 375/341; 371/43; 375/224
[58] Field of Search ................................. 375/224, 232, 375/262, 286, 341, 348; 371/43

[56] References Cited

U.S. PATENT DOCUMENTS

| | | | |
|---|---|---|---|
| 4,885,757 | 12/1989 | Provence | 371/43 |
| 5,081,651 | 1/1992 | Kubo | 375/94 |
| 5,131,011 | 7/1992 | Bergmans et al. | 375/101 |
| 5,263,053 | 11/1993 | Wan et al. | 375/94 |
| 5,319,649 | 6/1994 | Raghavan et al. | 371/43 |

OTHER PUBLICATIONS

A. W. M. van den Enden et al., "Discrete-time Signal Processing", Prentice Hall ISBN 0-13-216763-8.
Vilas Joshi et al., "Sequence Estimation Techniques for Digital Subscriber Loop Transmission with Crosstalk Interference", IEEE Transactions on Communications, vol. 38, No. 9, Sep. 1990, pp. 1367-1374.
Vachula et al., "On Optimal Detection of Band-Liminted PAM Signals with Excess Bandwidth", IEEE Transactions on Communications, vol. COM-29, No. 6, Jun. 1981, pp. 886-890.

*Primary Examiner*—Young Tse
*Attorney, Agent, or Firm*—Anne E. Barschall

[57] ABSTRACT

In a data receiver (6) a detection means (10) is used for determining a symbol value from the received signal. For reducing the effect of cyclostationary noise signals, a number of simultaneously operating detectors (12, 14) are used which derive a sequence of symbols from the input signal sampled at different instants. On the basis of a reliability measure simultaneously derived by the detectors, the symbol sequence whose associated reliability measure expresses the greatest reliability is conveyed to the output of the receiver with the aid of selection means.

8 Claims, 3 Drawing Sheets

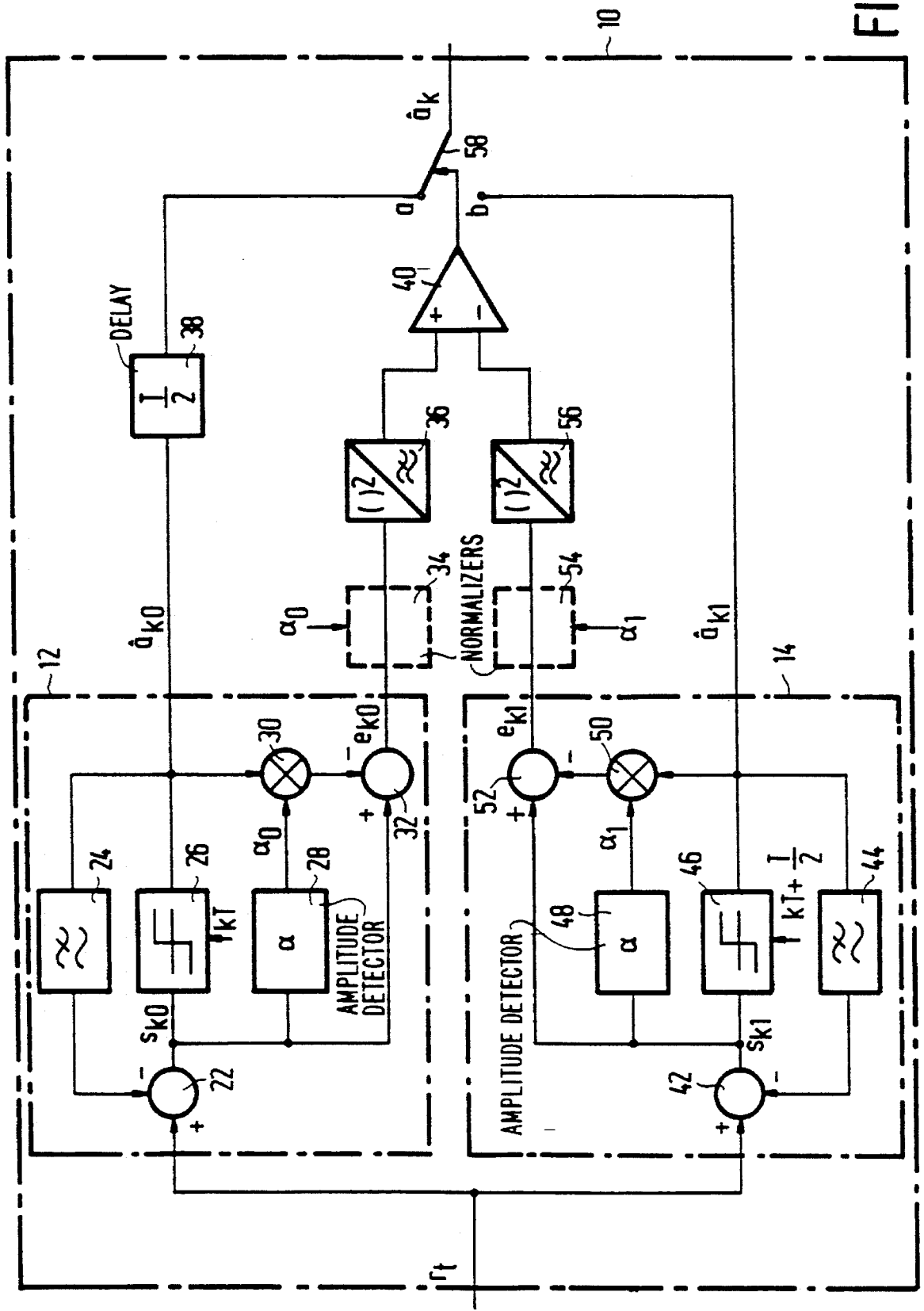

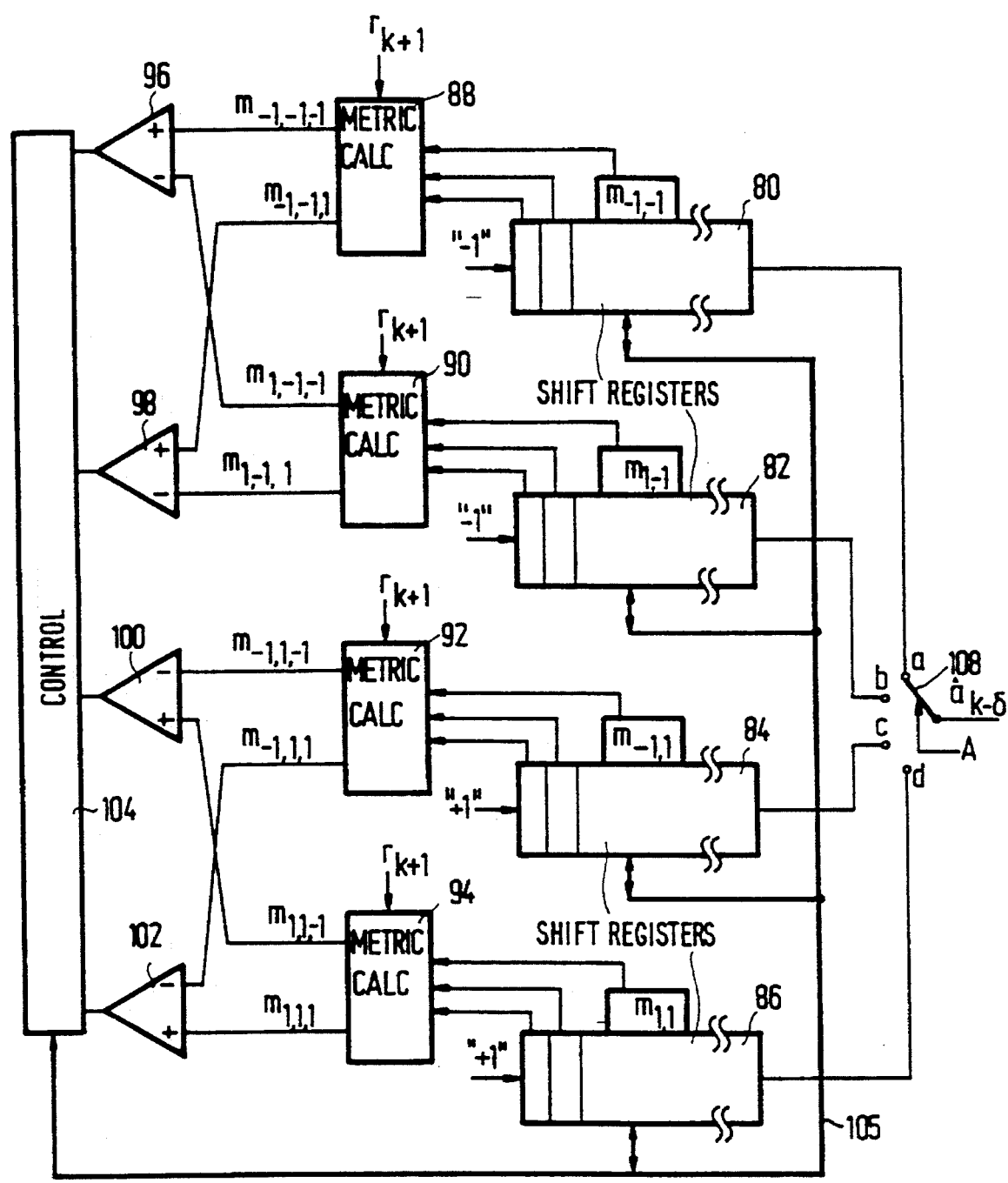
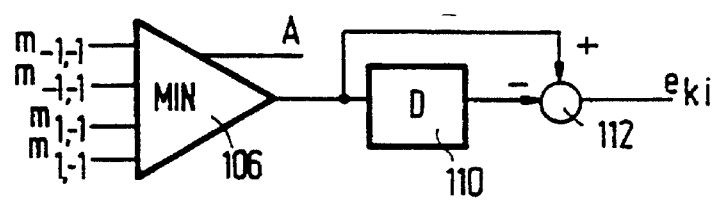
FIG. 4

TRANSMISSION SYSTEM WITH INCREASED SAMPLING RATE DETECTION

BACKGROUND OF THE INVENTION

1. Field of the Invention

The invention relates to a transmission system comprising a data transmitter, for applying data symbols to an input of a channel at a symbol rate, and a data receiver. The data receiver comprises deriving means for deriving a detection signal from an output signal of the channel, and a detection means for deriving a sequence of data symbols carried by the detection signal from N an integer number values of the detection signal per symbol interval. The detection means includes deriving means for deriving a reliability measure which is representative of the reliability of the sequence of data symbols derived from the detection signal.

The invention likewise relates to a receiver for such a system.

2. Related Art

A system as defined in the opening paragraph is known from the journal article "On Optimal Detection of Band-Limited PAM Signals with Excess Bandwidth" by G. M. Vachula and F. S. Hill in IEEE Transactions on Communications, Vol. COM-29, No. 6, June 1981, pp. 886–890.

Such a transmission system may be used, for example, for transmitting data signals over the public telephone network or for reconstructing data signals coming from a magnetic tape or disc. When data symbols are transmitted via a transmission medium or when data symbols are stored on a recording medium respectively, the data symbols to be transmitted or recorded respectively, are converted into analog pulses to be subsequently applied to the transmission medium or recording medium respectively, to be denoted hereinafter by the term channel.

In the receiver the output signal of the channel is generally filtered and then sampled at a sampling rate equal to the symbol rate 1/T, as a result of which a detection signal is obtained. If the bandwidth of the filtered output signal of the channel exceeds half the symbol rate value, a sampling rate higher than the symbol rate 1/T is necessary according to the Nyquist sampling theorem to avoid information present in the filtered output signal getting lost. This information getting lost may be shown by an enhanced symbol error rate when the sequence of data symbols is approximated from the detection signal.

In order to avoid information in the filtered output signal of the channel getting lost, a sampling ram which is a factor N higher than the symbol rate is used in the receiver known from above journal article. As a result, N different values of the detection signal per symbol interval are available for determining the sequence of data symbols carried by the detection signal.

For determining the maximum likelihood sequence of data symbols, a reliability measure, indicating how reliable the already determined data symbols are, is used in the prior-art transmission system. In the prior-art transmission system this is effected by means of a Viterbi detector. The detection signal is then sampled twice per symbol interval. There is thus a first sample and a second sample of the detection signal available per symbol interval. The reliability measure is proportional to the sum of the difference between the current and expected values of the first sample and also to the difference between the current and expected values of the second sample of the detection signal.

It has appeared that in such transmission systems the symbol error rate at a specific signal-to-noise ratio of the detection signal is still larger for some channels than may be expected with an optimum system.

SUMMARY OF THE INVENTION

It is an object of the invention to provide a transmission system as defined in the opening paragraph, in which the symbol error rate is further reduced relative to the state-of-the-art transmission system.

For this purpose, the invention is characterized, in that the detection means comprises a plurality of sub-detection means, each of the sub-detection means being arranged for determining a sequence of data symbols on the basis of at least one of the N values of the detection signal per symbol interval and determining a reliability measure associated to this maximum likelihood sequence of data symbols, and in that the detection means comprises selection means for selecting symbols from the data symbol sequence of which the associated reliability measure denotes the maximum reliability where N is an integer.

The invention is based on the recognition that the sub-optimum performance of the state-of-the-art transmission system is caused by the presence of commonly termed cyclostationary noise components in the detection signal. A signal is termed cyclostationary if the statistical properties such as, for example, mean value or autocorrelation function are not time-independent, but periodically time-dependent. An important example of cyclostationary noise signals is undesired crosstalk of cyclostationary data signals from neighbouring wire pairs in the local telephone network, as this may happen in ISDN networks. Another example is signal crosstalk from a neighbouring track to the reading head in magnetic recording.

As a result of the cyclostationarity of the noise signals the expectancy of the size of these noise signals is dependent on the sampling rate in the symbol interval.

By letting, according to the inventive idea, the detection means comprises sub-detection means which each operate at a different value of the detection signal situated in a specific symbol interval, it is possible to select the maximum reliability data symbols on the basis of the reliability measure of each of these detectors. They will generally be the data symbols belonging to the value of the detection signal for which there is a minimum expectancy value of the cyclostationary noise signal.

It should be observed that the implementation of the invention is also advantageous when cyclostationary noise signals occur in detection signals of which the useful part does satisfy the sampling theorem.

An embodiment of the invention is characterized, in that the reliability measure is dependent on a difference between a current value of the detection signal and an expected value of the detection signal for a sequence of data symbols.

Such a reliability measure may be simply determined on the basis of signals already occurring in the receiver, such as the detection signal and the symbols already determined. In this case the reliability of the determined symbols is larger as the reliability measure is smaller.

A further embodiment of the invention is characterized, in that the sub-detection means are Viterbi detectors and in that the reliability measure is dependent on the enhancement of the likelihood measure of the maximum likelihood sequence of candidate data per unit of time.

When Viterbi detectors are used, each Viterbi detector makes not only an estimation of the symbol sequence, but also an estimation of the likelihood of these symbols. This likelihood estimate, also termed likelihood measure, may also be used for deriving a likelihood measure belonging to the symbol sequence determined by the Viterbi detector, for making a choice between the most reliable symbol sequence.

A further embodiment of the invention is characterized, in that the reliability measure is dependent on an estimate of the power level of the detection signal belonging to the sub-detection means.

By utilizing a reliability measure normalized to an estimate of the power level of the detection signal belonging to each of the sub-detection means, a selection of the most reliable symbol sequence is then also guaranteed if the power levels of the detection signals applied to the various sub-detection means are different.

BRIEF DESCRIPTION OF THE DRAWING

The invention will now be further explained with reference to the drawing Figures, in which:

FIG. 2 shows a first embodiment of a detection means according to the invention;

FIG. 4 shows a sub-detection means according to the invention arranged as a Viterbi detector.

DETAILED DESCRIPTION OF THE DRAWING

Figure 1:
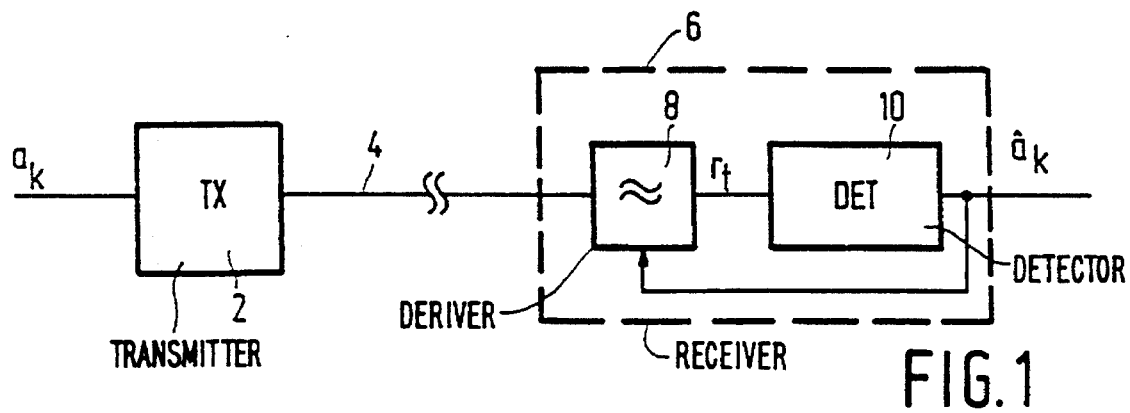
FIG. 1 shows a transmission system in which the invention may be used.

In the transmission system as shown in FIG. 1, a sequence of symbols $a_k$ to be transmitted by a transmitter 2 is converted into a signal suitable for transmission. This signal is fed to a channel 4. This channel may be a customary transmission channel, but also a magnetic or optical recording medium. The output signal of the channel 4 is applied to a receiver 6. In the receiver 6, a deriving means 8 for deriving a detection signal from an input signal derives a detection signal from the receiver input signal. The deriving means 8 habitually comprise a filter, for example, for partly suppressing intersymbol interference. The detection signal is applied to a detection means 10 which derives, from the detection signal, a sequence of decisions $â_k$ about the transmitted symbol sequence. Alternatively, it is possible for the sequence of symbols $â_k$ to be applied to the deriving means 8 for deriving the detection signal from the input signal.

In the detection means as shown in FIG. 2, the detection signal $r_t$ is applied to an input of a first sub-detection means 12 according to the inventive idea and to an input of a second sub-detection means 14.

A first output of the first sub-detection means 12 carrying output symbols $â_{k0}$ is connected via a delay element having delay T/2 to a contact a of a change-over switch 58, whereas an output of the second sub-detection means carrying output symbols $â_{k1}$ is directly connected to a contact b of the change-over switch 58. The symbols $â_k$ are available on the central contact of the change-over switch.

On a second output of the first sub-detection means 12, an error signal $e_{k0}$ is available which is a measure for the difference between the current value of the signal $s_{k0}$ and the expected value of the signal $s_{k0}$. On a second output of the second sub-detection means 14, an error signal $e_{k1}$ is available which is a measure of the difference between the current value of the signal $s_{k1}$ and the expected value of the signal $s_{k1}$. The error signal $e_{k0}$ ($e_{k1}$) is applied (via normalizing means 34 (54), as required, for normalizing the error signal according to the inventive idea) to a circuit 36 (56) which first squares the error signal and then applies the result to a low-pass filter. The output signals of the respective circuits 36 and 56 are the reliability measures according to the inventive idea and are applied to a positive or negative input respectively, of a comparator 40. The output signal of the comparator 40 is connected to a control input of the change-over switch 58.

The input signal of the first (second) sub-detection means 12 (14) is applied to a positive input of a subtracter circuit 22 (42). The output signal $s_{k0}$ ($s_{k1}$) of the subtracter circuit 22 (42) is applied to an input of a decision circuit 26 (46), an input of an amplitude detector 28 (48) and a positive input of a subtracter circuit 32 (52). The output of the decision circuit 26 (46) is connected to an input of a feedback filter 24 (44) and to a first input of a multiplier circuit 30 (50). The output of the decision circuit 26 (46) also forms the first output of the sub-detection means 12 (14). The output of the feedback filter 24 (44) is connected to a negative input of the subtracter circuit 22 (42). The output of the multiplier circuit 30 (50) is connected to a negative input of the subtracter circuit 32 (52). The output of the subtracter circuit 32 (52) carrying output signal $e_{k0}$ ($e_{k1}$) forms the second output of the first (second) sub-detection means 12 (14).

The first and second detection means (N=2) determine each a maximum likelihood sequence of data symbols $â_{k0}$, $â_{k1}$ respectively, with associated error signals $e_{k0}$ and $e_{k1}$ respectively. The first sub-detection means determines $â_{k0}$ on the basis of the value $r_t$ at instants of time kT (see FIG. 3) and the second sub-detection means determines $â_{k1}$ on the basis of the value of $r_t$ at instants kT+T/2. A squaring of the error signals provides signals whose magnitude augments according as the difference between the signal values $s_{k0}$ and $s_{k1}$, respectively, expected for the detected data symbols and the current value of these signals, increases. Since this difference is mainly caused by interference signals such as noise, the squared values of the signals $e_{k0}$ and $e_{k1}$ respectively, are a reliability measure for the detected symbols $â_{k0}$ and $â_{k1}$ respectively. By comparing the output signals of the circuits 36 and 56, a decision may be made as to which of the sub-detection means 12 or 14 produces the more reliable symbols. The output symbols $â_k$ are always taken from the detector producing the more reliable symbols as a result of the position of the switch 58, which is dependent on the outcome of the comparison represented by the output signal of the comparator 40.

The sub-detection means is constituted here by a decision feedback equalizer formed by a subtracter circuit 22 (42), the decision circuit 26 (46) and the feedback filter 24 (44). By applying the symbols $â_{k0}$ ($â_{k1}$) to the feedback filter 24 (44) and subtracting the output signal of the feedback filter 24 (44) from the signal $r_t$, it is possible to remove largely the postcursive intersymbol interference from the signal $r_t$. The amplitude detector 28 (48) forms an estimate of the amplitude of the signal $s_{k0}$ ($s_{k1}$). By multiplying the value of the symbols $â_{k0}$ ($â_{k1}$) by an estimate of the amplitude of the signal $s_{k0}$ ($s_{k1}$), a signal is obtained which may be considered a reconstructed (noiseless) signal $s_{k0}$ ($s_{k1}$). By subtracting this signal from the current value of the signal $s_{k0}$ ($s_{k1}$), an error signal $e_{k0}$ ($e_{k1}$) is obtained which is, for example, representative of the noise component in the signal $s_{k0}$ ($s_{k1}$).

The reliability measure according to the inventive idea may then be simply derived from this error signal as has already been explained.

If a considerable difference may be expected to occur between the amplitudes of the signals $s_{k0}$ and $s_{k1}$, it is necessary for the error signal $e_{k0}$ and $e_{k1}$ respectively, to be normalized with the amplitude of the associated signal $s_{k0}$ and $s_{k1}$ respectively. This is necessary because the reliability of the decisions does not only depend on the magnitude of the undesired noise component in the signal $s_{k0}$ and $s_{k1}$ respectively, but naturally also on the amplitude of the desired part of the signal $s_{k0}$ and $s_{k1}$ respectively. The output signal of the normalizing means 34 (54) is then equal to $e_{k0}/\alpha_0$ ($e_{k1}/\alpha_1$), where $\alpha_0$ and $\alpha_1$ respectively, are estimates of the amplitude of the signals $s_{k0}$ and $s_{k1}$ respectively. A reliability measure thus obtained is dependent on the signal-to-noise ratio of the input signal of the sub-detection means.

Although the difference between the amplitudes $s_{k0}$ and $s_{k1}$ may be considerably large, a circuit as shown in FIG. 2 may nevertheless be useful because the difference of the cyclostationary noise components may even be larger. In the journal article "Sequence Estimation Techniques for Digital Subscriber Loop Transmission with Crosstalk Interference" by V. Joshi and D. D. Falconer in IEEE Transactions on Communications, Vol. 38, No. 9, September 1990, a possible value of about 20 dB is mentioned as the difference between the values of a stationary crosstalk component at two sampling instants a half symbol interval apart.

The feedback filter 24 (44) may be arranged as an adaptive transversal filter. Transversal filters are known per se from the title "Discrete-time signal processing" by A. W. M. van den Enden and N. A. M. Verhoeckx, Prentice Hall, ISBN 0-13-216763-8 pp. 169–170. Such a transversal filter has the following transfer function H(D):

$$H(D) = \sum_{i=1}^{N} b_i \cdot D^i \quad (1)$$

Herein N is the impulse response length of the feedback filter expressed in symbol intervals T, $b_i$ the Filter coefficient belonging to the $i^{th}$ tap of the transversal filter and D the delay operator which represents a delay over a symbol interval T. According to the LMS least means square algorithm for $i=1 \ldots N$, the coefficients $b_i$ may be determined recursively as follows:

$$b_{i,k} = b_{i,k-1} + \lambda e_k \cdot \hat{a}_{k-i} \quad (2)$$

In (2) $\hat{a}_{k-i}$ is the symbol $\hat{a}_{k0}$ delayed over i symbol intervals for the feedback filter 24 and $\hat{a}_{k1}$ for the feedback filter 44 respectively, and $\lambda$ is an adaptation constant which is generally rather small ($\pm 0.01$) and $e_k$ is an error signal representing the difference between the actual and expected values of the signal $S_k$. In detection means 12, $e_x$ is $e_{x0}$ and in detection means 14, $e_k$ is $e_{k1}$. The LMS algorithm is described, for example, in aforementioned title on pages 187–189.

An estimate of the amplitude $\alpha_0$ ($\alpha_1$) of the signal $s_{k0}$ ($s_{k1}$) may be similarly determined:

$$\alpha_k = \alpha_k + \mu \cdot e_k \cdot \hat{a}_k \quad (3)$$

Herein $\mu$ is a small adaptation constant ($\pm 0.01$).

Figure 3:
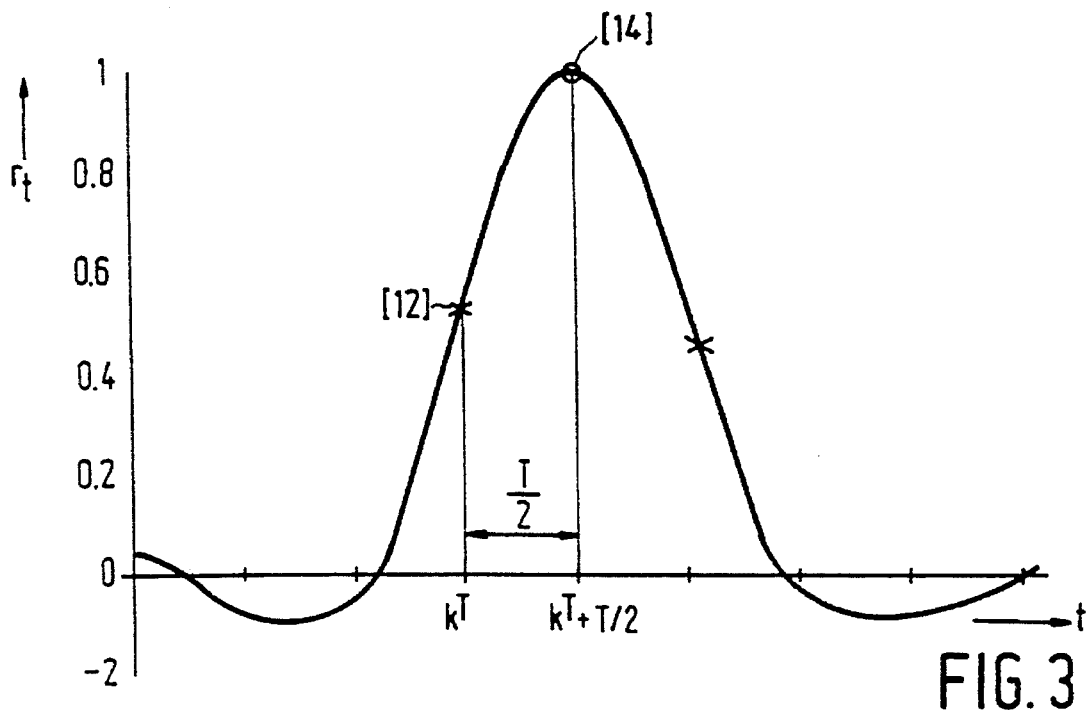
FIG. 3 shows an example of a pulse belonging to a symbol $a_k$ and also represents the sampling instants.

In the pulse as shown in FIG. 3 the sampling instants of the detection means 12 and 14 respectively, are indicated. The detection means 12 samples the filtered output signal of the channel at an instant T/2 situated before the maximum of the main pulse, whereas the detection means samples the filtered output signal of the channel at the maximum of the main pulse. The intersymbol interference caused by the pulse is removed by means of the feedback filters 24 (44) in the detection means.

It should be observed that the invention may be simply arranged with more than two sub-detection means, which in some situations may lead to a further reduced symbol error rate.

In the Viterbi detector as shown in FIG. 4, the four candidate sequences (survivors) having different values $\hat{a}_{k-1}$, $\hat{a}_k$ of the most recently applied symbols are stored in shift registers 80, 82, 84 and 86. For example, shift register 80 stores the survivor $\hat{a}_{k-1}, \hat{a}_k = -1, -1$, shift register 82 the survivor $\hat{a}_{k-1}, \hat{a}_k = 1, -1$, shift register 84 the survivor $\hat{a}_{k-1}, \hat{a}_k = -1, 1$ and shift register 86 the survivor $\hat{a}_{k-1}, \hat{a}_k = 1, 1$. Additionally stored for each survivor is a likelihood measure $m_{\hat{a}_{k-1}, \hat{a}_k}$ for that survivor. The two most recent symbols of each of the survivors are applied with their appropriate likelihood measure to their own arithmetic units for determining the new likelihood measure. For example, shift register 80 is coupled to arithmetic unit 88, shift register 82 to arithmetic unit 90, shift register 84 to arithmetic unit 92 and shift register 86 to arithmetic unit 94. Also the signal $r_{k+1}$, being the detection signal for the sub-detection means as shown in FIG. 2, is applied to the arithmetic units 88, 90, 92 and 94.

An output of the arithmetic unit 88 carrying output signal $m_{-1,-1,-1}$ is connected to a positive input of a comparator 96, whereas an output of the arithmetic unit 90 carrying an output signal $m_{1,-1,-1}$ is connected to a negative input of the comparator 96. An output of the arithmetic unit 88 carrying output signal $m_{-1,-1,1}$ is connected to a positive input of a comparator 98, whereas an output of the arithmetic unit 90 carrying output signal $m_{1,-1,1}$ is connected to a negative input of the comparator 98. An output of the arithmetic unit 92 carrying output signal $m_{-1,1,-1}$ is connected to a negative input of a comparator 100, whereas an output of the arithmetic unit 94 carrying output signal $m_{1,1,-1}$ is connected to a positive input of the comparator 100. An output of the arithmetic unit 92 carrying output signal $m_{-1,1,1}$ is connected to a negative input of the comparator 102, whereas an output of the arithmetic unit 94 carrying output signal $m_{1,1,1}$ is connected to a positive input of the comparator 102.

The outputs of the comparators 96, 98, 100 and 102 are connected to inputs of a control unit 104. The control unit 104 and the shift registers 80, 82, 84 and 86 are interconnected via a bus 105. The signals $m_{-1,-1}$, $m_{-1,1}$, $m_{1,-1}$ and $m_{1,1}$ are applied to a comparator circuit 106. A first output of the comparator circuit 106 carrying output signal A is connected to a control input of a selector switch 108. The output of the comparator circuit 106 is connected to an input of a delay element 110 and to a positive input of a subtracter circuit 112. The output of the delay element 110 is connected to a negative input of the subtracter circuit 112.

An output of the shift register 80 having the symbol value of the oldest symbol of the relevant survivor as an output signal, is connected to a contact a of the selector switch 108. Similarly, outputs of the shift registers 82, 84 and 86 are connected to contacts b, c and d of the selector switch 108. The maximum likelihood sequence of symbols $\hat{a}_{k-\delta}$ is present on the central contact of the selector switch 108, where $\delta$ is a specific delay.

In the Viterbi detector as shown in FIG. 4, the maximum likelihood sequence of transmitted data symbols is determined by recursively updating a restricted number of $M=L^{N-1}$ survivors, in which L is the number of levels of the transmission or recording signal used, and in which N is the channel impulse response length expressed in numbers of samples. This number is necessary because the channel may adopt M states, whereas the receiver is to be capable of distinguishing between these states.

Once the M survivors with associated likelihood measures have been determined, each survivor is extended to more survivors when a next data symbol is received, differing only in their most recently appended data symbols. The likelihood measure associated to each new survivor is derived from the likelihood measure of the survivor the new survivor is derived from plus an even function of the difference between the current detection signal and the expected detection signal which even function belongs to this new survivor. Suitable even functions are, for example, the commonly termed $L_1$ norm (|x|) and $L_2$ norm ($x^2$), of which the $L_2$ norm is used more.

For achieving that the required storage capacity and computation capacity still remains independent of the length of the transmitted sequence of data symbols, for each of the different possible channel states only the maximum likelihood survivor is stored.

The previous explanation of the operation of a Viterbi detector will be further clarified with reference to FIG. 4. It is then assumed that the number of levels L of the transmitted data signal is equal to 2 and that the length N of the channel impulse response is equal to 3 symbol intervals. This leads to the fact that a Viterbi detector having $2^{(3-1)}=4$ survivors is necessary.

Figure 5:
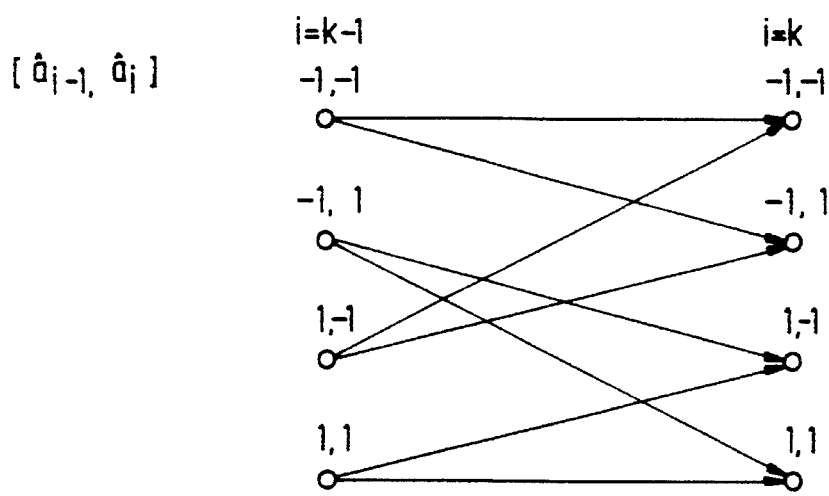
FIG. 5 shows a trellis of channel states for which the Viterbi detector as shown in FIG. 4 is arranged.

These 4 survivors are stored in the shift registers 80 (−1,−1), 82 (1,−1), 84 (−1,1) and 86 (1,1). When the survivors are extended, they are extended by the symbol value −1 or +1. It appears that each survivor cannot change into more than two different new survivors by the extension by a new symbol value. This also appears from the trellis of FIG. 5 in which each old survivor cannot be extended to more than two new survivors. Likewise, each new survivor cannot be derived from more than two old survivors. The arithmetic units 88, 90, 92 and 94 together with the comparators 96, 98, 100 and 102 and the control unit 104 determine from which old survivors the new survivors are derived.

Each arithmetic unit determines on the basis of the input magnitudes $\hat{a}_{k-1}, \hat{a}_k$, $m_{\hat{a}_{k-1},\hat{a}_k}$, and the signal $r_{k+1}$, the likelihood measure $m_{\hat{a}_{k-1},\hat{a}_k,\hat{a}_{k+1}}$ of the two possible extensions of the relevant survivor. For this purpose, the arithmetic units utilize an (adaptively determined) channel model represented by the estimates $h_0$, $h_1$ and $h_2$ of the channel impulse response. Hereto, the difference e between the signal r and the value of the signal $r_{k+1}$ expected for the new survivors is determined first. This is effected on the basis of the following relation:

$$e_{\hat{a}_{k-1},\hat{a}_k,-1} = r_{k+1} - (-h_0 + \hat{a}_k \cdot h_1 + \hat{a}_{k-1} \cdot h_2)$$

$$e_{\hat{a}_{k-1},\hat{a}_k,+1} = r_{k+1} - (+h_0 + \hat{a}_k \cdot h_1 + \hat{a}_{k-1} \cdot h_2) \quad (4)$$

Herein and $\hat{a}_k$ and $\hat{a}_{k-1}$ are the most recently appended symbol values $e_{\hat{a}_{k-1},\hat{a}_k,+1}$ and $e_{-1}$ respectively, are the error signals belonging to an extension of the relevant survivor by +1 or −1 respectively, and $h_0$, $h_1$ and $h_2$ are estimates of the first three samples of the channel impulse response. The values of $h_0$, $h_1$ and $h_2$ may be determined similarly to the coefficients $b_i$ of the feedback filter for the sub-detection means as shown in FIG. 2 with the aid of (2). Preferably, use is made of the error signal e which belongs to the maximum likelihood survivor.

For the new likelihood measures $m_{\hat{a}_k,+1}$ and $m_{\hat{a}_k,-1}$ respectively, belonging to the extended survivors, the following may be determined from (4):

$$m_{\hat{a}_{k-1},\hat{a}_k,-1} = m_{\hat{a}_{k-1},\hat{a}_k} + e^2_{\hat{a}_{k-1},\hat{a}_k,-1}$$

$$m_{\hat{a}_{k-1},\hat{a}_k,+1} = m_{\hat{a}_{k-1},\hat{a}_k} + e^2_{\hat{a}_{k-1},\hat{a}_k,+1} \quad (5)$$

Since each new survivor is a continuation one out of two old survivors, the various arithmetic units constantly determine two values of $m_{\hat{a}_k,\hat{a}_{k+1}}$. These two values of the likelihood measure are distinguished by $m_{+1,\hat{a}_k,\hat{a}_{k+1}}$ and $m_{-1,\hat{a}_k,\hat{a}_{k+1}}$.

According to the Viterbi principle, from the two survivors ending in symbol values $\hat{a}_k,\hat{a}_{k+1}$, only the survivor having the smaller value of $m_{\hat{a}_k,\hat{a}_{k+1}}$ is stored. For this purpose, corresponding values of $m_{+1,\hat{a}_k,\hat{a}_{k+1}}$ and $m_{-1,\hat{a}_k,\hat{a}_{k+1}}$ are compared by means of the comparators 96, 98, 100 and 102. On the basis of the results of this comparison, the new survivors are derived from the old ones. How this happens will be shown in the Table below:

TABLE 1

| Q96 | Q98 | Q100 | Q102 | C80 | C82 | C84 | C86 |
|---|---|---|---|---|---|---|---|
| 0 | 0 | 0 | 0 | C80,−1 | C86,−1 | C80,+1 | C86,+1 |
| 0 | 0 | 0 | 1 | C80,−1 | C86,−1 | C80,+1 | C84,+1 |
| 0 | 0 | 1 | 0 | C80,−1 | C84,−1 | C80,+1 | C86,+1 |
| 0 | 0 | 1 | 1 | C80,−1 | C84,−1 | C80,+1 | C84,+1 |
| 0 | 1 | 0 | 0 | C80,−1 | C86,−1 | C82,+1 | C86,+1 |
| 0 | 1 | 0 | 1 | C80,−1 | C86,−1 | C82,+1 | C84,+1 |
| 0 | 1 | 1 | 0 | C80,−1 | C84,−1 | C82,+1 | C86,+1 |
| 0 | 1 | 1 | 1 | C80,−1 | C84,−1 | C82,+1 | C84,+1 |
| 1 | 0 | 0 | 0 | C82,−1 | C86,−1 | C80,+1 | C86,+1 |
| 1 | 0 | 0 | 1 | C82,−1 | C86,−1 | C80,+1 | C84,+1 |
| 1 | 0 | 1 | 0 | C82,−1 | C84,−1 | C80,+1 | C86,+1 |
| 1 | 0 | 1 | 1 | C82,−1 | C84,−1 | C80,+1 | C84,+1 |
| 1 | 1 | 0 | 0 | C82,−1 | C86,−1 | C82,+1 | C86,+1 |
| 1 | 1 | 0 | 1 | C82,−1 | C86,−1 | C82,+1 | C84,+1 |
| 1 | 1 | 1 | 0 | C82,−1 | C84,−1 | C82,+1 | C86,+1 |
| 1 | 1 | 1 | 1 | C82,−1 | C84,−1 | C82,+1 | C84,+1 |

Table 1 denotes Q96 to Q102 for the output signal of the relevant comparator 96 to 102. A logic "0" level is meant to denote that the signal on the positive input of the comparator is smaller than the signal on the negative input of the comparator. A logic "1" level is meant to denote that the signal on the positive input of the comparator is larger than the signal on the negative input of the comparator. C80 to C86 stands for the contents of the shift registers 80 to 86 after extension of the survivor. If the column of C80 states C82, −1, this is meant to denote that in shift register 80 the contents of shift register 82 shifted by one symbol position are taken over and that the most recent symbol in shift register 80 adopts a symbol value equal to −1.

When information is transferred from one shift register to another, also the associated (minimum) value of $m_{\hat{a}_{k+1},\hat{a}_k}$ is stored in the register for the likelihood measure for that survivor.

The comparator circuit 106 determines the minimum value of the likelihood measures of the survivors. The delay element and the subtracter means determine the enhancement of the likelihood measure during the delay D. This enhancement of the likelihood measure is the reliability measure according to the inventive idea which is utilized for selecting the most reliable symbol sequence. This minimum value is used for controlling the selection means 108 shown in FIG. 2. It should be observed that the squaring circuit shown in FIG. 2 may often be omitted when Viterbi sub-detection means are used, because this squaring operation is already performed in the Viterbi sub-detection means.

The comparator circuit 106 also produces control signal A which denotes the shift register that stores the survivor having the smallest likelihood measure. By switching the selector switch in response to the control signal A over to this shift register, the maximum likelihood survivor is available on the output of the sub-detection means.

With the Viterbi detector as shown in FIG. 4, it is necessary to subtract at regular intervals a constant value C from all the likelihood measures to avoid these likelihood measures enhancing in unrestricted fashion. For these likelihood measures are enhanced by a non-negative value with each extension of the survivor. This subtraction by a constant value may be effected, for example, periodically or only if one of the likelihood measures exceeds a specific threshold value.

Without precautionary measures the reliability measure according to the inventive idea would be an amount C too small as a result of the subtraction of the constant value C from the likelihood measure, as long as this constant value C is subtracted from only either of the values of the likelihood measures used for determining the reliability measure. In order to avoid this reliability measure becoming too small, the constant value is to be added to this reliability measure. This adding is to be effected only as long as the subtraction of the constant value C affects either of the likelihood measures used for determining the reliability measure.

For example, if the delay of the delay element 110 is equal to 10 symbol intervals, this constant value is to be added to the reliability measure for as long as 10 symbol intervals including the instant at which the constant value is subtracted from the likelihood measure.

If the channel has an impulse response lasting two symbol intervals, a Viterbi detector having two survivors may be used. In that case, in lieu of updating two likelihood measures, it will be sufficient to have a difference metric which denotes the difference between the aforementioned likelihood measures. For such a Viterbi detector (4) and (5) may be written as follows:

$$e_{\hat{\alpha}_k,-1} = r_{k+1} - (-h_0 + \hat{a}_k \cdot h_1)$$

$$e_{\hat{\alpha}_k,+1} = r_{k+1} - (+h_0 + \hat{a}_k \cdot h_1) \quad (6)$$

$$m_{\alpha_k,-1} = m_{\alpha_k} + e^2_{\hat{\alpha}_k,-1}$$

$$m_{\alpha_k,+1} = m_{\alpha_k} + e^2_{\hat{\alpha}_k,+1} \quad (7)$$

For likelihood measures of the remaining survivors the following may be written:

$$m_{\hat{\alpha}_{k+1}=+1} = MIN\{m_{\hat{\alpha}_k=+1} + e^2_{+1,+1}, m_{\hat{\alpha}_k=-1} + e^2_{-1,+1}\}$$

$$m_{\hat{\alpha}_{k+1}=-1} = MIN\{m_{\hat{\alpha}_k=+1} + e^2_{+1,-1}, m_{\hat{\alpha}_k=-1} + e^2_{-1,-1}\} \quad (8)$$

From (8) three magnitudes $Q_1$, $Q_2$ and $Q_3$ may be derived: The difference metric $\Delta_{k+1} = (m_{\hat{\alpha}k+1=1} - m_{\hat{\alpha}k+1=-1})$ may be simply found by subtracting $Q_2$ from $Q_1$. There should be observed that the expression of $m_{\hat{\alpha}k=1}-$ $$Q_1 = m_{\hat{\alpha}_{k+1}=+1} - m_{\hat{\alpha}_k=-1} = MIN\{m_{\hat{\alpha}_k=+1} - m_{\hat{\alpha}_k=-1} + e^2_{+1,30\ 1}, e^2_{-1,+1}\}$$

$$Q_2 = m_{\hat{\alpha}_{k+1}=-1} - m_{\hat{\alpha}_k=-1} = MIN\{m_{\hat{\alpha}_k=+1} - m_{\hat{\alpha}_k=-1} + e^2_{+1,31\ 1}, e^2_{-1,-1}\}$$

$$Q_3 = m_{\hat{\alpha}_{k+1}=+1} - m_{\hat{\alpha}_{k+1}=+1} = MIN\{e^2_{+1,+1}, m_{\hat{\alpha}_k=-1} - m_{\hat{\alpha}_k=+1} + e^2_{-1,+1}\} \quad (9)$$

$m_{\hat{\alpha}k=-1}$ is equal to $\Delta_k$. Utilizing this, (9) changes into:

$$Q_1 = MIN\{\Delta_k + e^2_{+1,+1}, e^2_{-1,+1}\}$$

$$Q_2 = MIN\{\Delta_k + e^2_{+1,-1}, e^2_{-1,-1}\}$$

$$Q_3 = MIN\{e^2_{+1,+1}, -\Delta_k + e^2_{-1,+1}\} \quad (10)$$

$Q_2$ is the enhancement of $m_{\hat{\alpha}k=1}$, whereas $Q_3$ represents the enhancement of $m_{\hat{\alpha}k=-1}$. If $\Delta_k$ is positive, this denotes that the survivor ending in $-1$ is the maximum likelihood sequence. $Q_2$ is then to be taken as the reliability measure. If $\Delta_k$ is negative, this denotes that the survivor ending in $+1$ is the maximum likelihood sequence. $Q_3$ is then to be taken as the reliability measure.

A further observation is made about the possibility of substituting a Viterbi detector as shown in FIG. 4 for the detection means 12 in the detection means shown in FIG. 2. In so doing the disadvantage is avoided of the detection means 12 having a signal available with a lower amplitude, because the detector 12 can utilize both the contribution of a pulse at an instant T/2 before the maximum of this pulse and the contribution of the pulse at an instant T/2 after the maximum of the pulse. In FIG. 3 the two samples which can be utilized in the detection means 12 arranged as a Viterbi detector are referenced x.

Although the number of sub-detection means in the exemplary embodiments is equal to the number of samples N of the filtered output signal of the channel, it is alternatively conceivable that the number of sub-detection means differs from N. An example of this is sub-detection means which utilizes a number of M samples per symbol interval, so that no more than N/M sub-detection means are necessary. Alternatively it is possible that specific samples are utilized by more than one detection means, so that the number of sub-detection means may also be greater than N.

I claim:

1. A transmission system comprising
   a data transmitter for applying data symbols to an input of a channel at a symbol rate and
   a data receiver comprising
   deriving means for deriving a detection signal from an output signal of the channel, a detection means for deriving a sequence of data symbols carried by the detection signal from N values of the detection signal per symbol interval, where N is an integer, the detection means including a plurality of sub-detection means, each of the sub-detection means being arranged for determining a respective sequence of data symbols on the basis of at least one of the N values of the detection signal per symbol interval where N is an integer such that $N \geq 2$ and determining a reliability measure associated to the respective sequence of data symbols, and selection means for selecting symbols from the sequence of data symbols for which the associated reliability measure denotes a maximum reliability.

2. The transmission system as claimed in claim 1, characterized in that the reliability measure is dependent on a difference between a current value of the detection signal and an expected value of the detection signal for the sequence of data symbols.

3. The transmission system as claimed in claim 2, characterized in that
   the plurality of sub-detection means are Viterbi detectors and
   the reliability measure is dependent on enhancement of the reliability measure of the sequence of data symbols which is a maximum likelihood survivor per unit time.

4. The transmission system as claimed in claim 2, characterized in that the reliability measure is dependent on an estimate of the power level of the detection signal belonging to the plurality of sub-detection means.

5. A data receiver comprising
   deriving means for deriving a detection signal from an output signal of a channel,
   detection means for deriving a sequence of data symbols carried by the detection signal from N values of the detection signal per symbol interval, where N is an integer, the detection means including a plurality of sub-detection means, each of the sub-detection means being arranged for determining a respective sequence of data symbols on the basis of at least one of the N values of the detection signal per symbol interval where N is an integer such that $N \geq 2$ and determining a reliability measure associated to the respective sequence of data symbols, and selection means for selecting symbols from the sequence of data symbols for which the associated reliability measure denotes a maximum reliability.

6. The data receiver as claimed in claim 5, characterized in that the reliability measure is dependent on a difference between a current value of the detection signal and an expected value of the detection signal for the sequence of data symbols.

7. Data receiver as claimed in claim 6, characterized in that the plurality of sub-detection means are Viterbi detectors and the reliability measure is dependent on enhancement of the reliability measure of that sequence of data symbols which is a maximum likelihood survivor per unit of time.

8. The data receiver as claimed in claim 6, characterized in that the reliability measure is normalized to an estimate of the power level of the detection signal belonging to the plurality of sub-detection means.

* * * * *